United States Patent [19]

Colaluca

[11] 3,865,238

[45] Feb. 11, 1975

[54] TAPE PROTECTING COVER DEVICE

[75] Inventor: Donald M. Colaluca, Dallas, Tex.

[73] Assignee: Raymond Lee Organization, New York, N.Y. ; a part interest

[22] Filed: Dec. 27, 1973

[21] Appl. No.: 428,801

[52] U.S. Cl. .............. 206/404, 220/55 N, 220/55.1, 242/71.8

[51] Int. Cl. .. B65d 85/04, B65d 85/66, B65h 55/00

[58] Field of Search ................... 242/71.8, 197–200; 206/389, 400–406, 387; 220/55 A, 55 B, 55 K, 55 N, 55 W, 55.1

[56] References Cited

UNITED STATES PATENTS

| | | | |
|---|---|---|---|
| 1,132,766 | 3/1915 | Delaney | 206/400 |
| 2,563,198 | 8/1951 | Thalhammer | 242/71.8 A |
| 3,349,898 | 10/1967 | Palson et al. | 206/405 |
| 3,473,649 | 10/1969 | Posso | 206/404 |

*Primary Examiner*—Leonard D. Christian
*Attorney, Agent, or Firm*—Daniel Jay Tick

[57] ABSTRACT

A protecting cover device for tape or film on a reel comprises a plurality of housings each comprising slidably mounted telescoping tube sections mounted at one end on the reel and extending in spaced relation substantially perpendicularly to the surface of the reel. Each of a plurality of springs is in a corresponding one of the housings. A reel cover for covering the reel is mounted on the other end of each of the plurality of housings. A releasable locking device on the reel cover releasably locks the springs in compressed condition to lock the cover on the reel whereby when the locking device is in released condition the springs urge the cover away from the reel to release the cover from the reel.

3 Claims, 4 Drawing Figures

TAPE PROTECTING COVER DEVICE

DESCRIPTION OF THE INVENTION

The present invention relates to a tape protecting cover device. More particularly, the invention relates to a protecting cover device for tape or film.

The principal object of the invention is to provide a tape protecting cover device of simple but sturdy structure which is self-packing, requires no covers, requires less storage area, is utilizable with ease, facility, simplicity, convenience and rapidity, provides considerable protection from foreign matter, is readily secured by lock and key, is inexpensive in manufacture, prolongs the life of the tape and is utilizable in many areas which are not readily accessible.

In order that the invention may be readily carried into effect, it will now be described with reference to the accompanying drawing, wherein.

In the FIGS., the same components are identified by the same reference numerals.

The protecting cover device of the invention is for tape of any type, such as for example, motion picture film.

Figure 3:
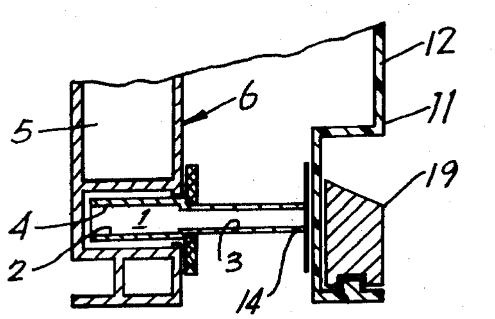
FIG. 3 is a sectional view of part of the tape protecting cover device of the invention in released condition.

The cover device of the invention comprises a plurality of housings, of which one housing 1 is shown in FIG. 3. Each of the housings comprises slidably mounted telescoping tube sections 2 and 3 (FIG. 3) mounted at one end 4 (FIG. 3) on the tape or film reel 5 (FIG. 3). The housings extend in spaced relation substantially perpendicularly to the surface 6 (FIG. 3) of the reel 5.

Each of a plurality of springs 7, 8, 9 and 10 (FIG. 1) is in a corresponding one of the housings.

A reel cover 11 (FIGS. 1 to 4) covers the reel 5. The reel cover 11 comprises a substantially disc like member 12 (FIGS. 1 to 4) having a substantially perpendicular flange 13 (FIG. 2) around its circumference. The reel cover 11 is mounted on the other end 14 (FIG. 3) of each of the plurality of housings.

Figure 4:
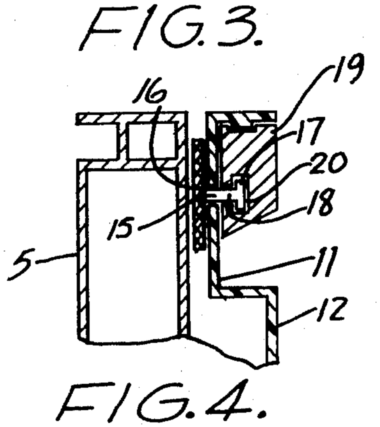
FIG. 4 is a sectional view of the diametrically opposite part of the tape protecting cover of the invention in locked condition.
Figure 2:
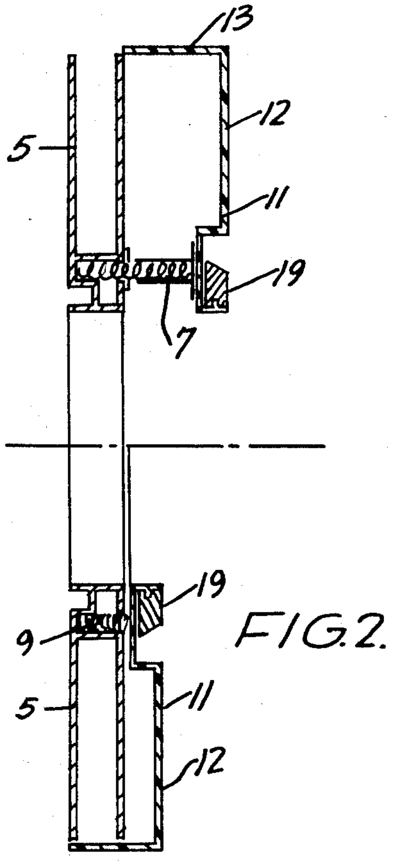
FIG. 2 is a diametrical sectional view of the tape protecting cover device of the invention showing the device in released and locked condition.

A releasable locking device on the reel cover 11 releasably locks the springs 7, 8, 9 and 10 in compressed condition, as shown in the lower half of FIG. 2 and FIG. 4, to lock the cover on the reel 5. When the locking device is in released condition, as shown in the upper half of FIG. 2 and FIG. 3, the springs 7, 8, 9 and 10 urge the cover 11 away from the reel 5.

Figure 1:
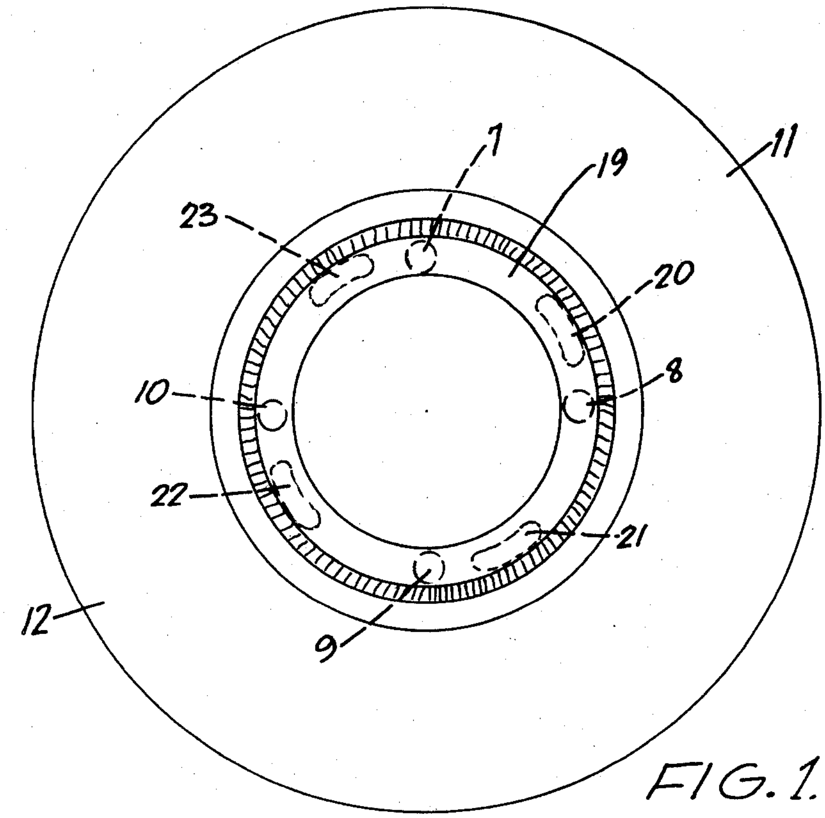
FIG. 1 is a front view of an embodiment of the tape protecting cover device of the invention.

The locking device comprises a plurality of spaced stems, of which one stem 15 is shown in FIG. 4. Each of the stems is affixed at one end 16 (FIG. 4) to the reel 5. Each stem has an overhanging head 17 (FIG. 4) at the other end 18 (FIG. 4). An annular ring 19 (FIGS. 1 to 4) is rotatably mounted on the reel cover 11 and has a plurality of spaced slots 20, 21, 22 and 23 (FIG. 1). Each of the slots 20, 21, 22 and 23 accommodates a corresponding one of the stems at the head thereof upon manual rotation of the ring 19 in a predetermined direction. The slot 20 is shown in FIG. 4 to accommodate the stem 15 at the head 17 thereof.

While the invention has been described by means of specific examples and in specific embodiments, I do not wish to be limited thereto, for obvious modifications will occur to those skilled in the art without departing from the spirit and scope of the invention.

I claim:

1. A protecting cover device for tape or film on a reel, said cover device comprising a plurality of housings each comprising slidably mounted telescoping tube sections mounted at one end on the reel and extending in spaced relation substantially perpendicularly to the surface of the reel;

a plurality of springs each in a corresponding one of the housings;

a reel cover for covering the reel mounted on the other end of each of the plurality of housings; and releasable locking means on the reel cover for releasably locking the springs in compressed condition to lock the cover on the reel whereby when the locking means is in released condition the springs urge the cover away from the reel to release the cover from the reel.

2. A protecting cover device as claimed in claim 1, wherein the locking means comprises a plurality of spaced stems affixed at one end to the reel each having an overhanging head at the other end and an annular ring rotatably mounted on the reel cover and having a plurality of spaced slots formed therein each for selectively accommodating a corresponding one of the stems at the head thereof upon manual rotation of the ring in a predetermined direction.

3. A protecting cover device as claimed in claim 2, wherein the reel cover comprises a substantially disc like member having a substantially perpendicular flange around its circumference.

* * * * *